United States Patent [19]

Everts

[11] 4,223,441
[45] Sep. 23, 1980

[54] FLAIL FOR A ROTARY VEGETATION CUTTER

[76] Inventor: Robert G. Everts, 2118 Birchwood Ave., Mesa, Ariz. 85204

[21] Appl. No.: 764,825

[22] Filed: Feb. 2, 1977

[51] Int. Cl.³ .................. A01D 55/18; A01G 3/06
[52] U.S. Cl. .................................. 30/347; 56/12.7
[58] Field of Search ............... 30/276, 347; 15/198, 15/159 A; 51/400; 174/110 SR, 110 N; 56/12.7

[56] References Cited

U.S. PATENT DOCUMENTS

| | | | |
|---|---|---|---|
| 2,426,413 | 8/1947 | Pollett | 174/110 SR |
| 2,495,559 | 1/1950 | Weiler | 15/198 |
| 2,676,447 | 4/1954 | Asbury | 15/198 X |
| 2,984,053 | 5/1961 | Peterson | 15/198 X |
| 3,325,846 | 6/1967 | Goss | 15/197 X |
| 3,708,967 | 1/1973 | Geist et al. | 56/12.7 |

*Primary Examiner*—Jimmy C. Peters
*Attorney, Agent, or Firm*—Donald D. Mon

[57] ABSTRACT

A flail for a rotary vegetation cutter. The flail is attached to a rotor and is centrifugally swung around the axis of rotation of the rotor to strike vegetation such as grass and weeds to cut them down. The flail comprises a plurality of metal filaments braided into an elongated strand and an abradable jacket surrounding and embracing the strand. When rotated the flail strikes and cuts objects in its path, the jacekt near its free end abrading away to expose the filaments adjacent to the free end. The strand unravels where the jacket has been removed to form a group of loose metallic filament ends.

4 Claims, 4 Drawing Figures

FLAIL FOR A ROTARY VEGETATION CUTTER

This invention relates to vegetation cutters of the kind which have a rotor from which a flail projects and is turned around the central axis of the rotor so as to cut vegetation such as grass and weeds.

Vegetation cutters which include flails are known from U.S. Pat. Nos. 3,708,967; 3,826,068 and 3,859,776 issued Jan. 9, 1973; July 30, 1974 and Jan. 14, 1975 respectively. It is characteristic of such cutters that they have a rotor with a peripheral sidewall from which a length of flexible flail material projects. When the rotor is turned, the flail cuts into vegetation adjacent to the rotor.

The use of solid wire for flail material is generally regarded as both unsatisfactory and potentially dangerous. If it is made with a large enough cross-section to resist the bending, blows, and work hardening which occur during operation, then it will be so large and heavy as to constitute a risk of injury if it strikes the user. Not only is it heavy enough to harm the user by a direct blow, but also it is strong enough that it will propel small rocks and the like, turning them into dangerous projectiles.

To avoid the foregoing disadvantages, it has been proposed to make the flail of a resinous plastic material. There is no question that this is a safety advantage over a solid metal flail, but it does suffer from the disadvantage that the plastic is abradable, tends to crack, is light in weight, and presents a dull cutting surface to the vegetation.

Also, because a plastic flail is so lightweight, it is customary to attempt to increase its cutting ability by speeding up the rotor. However, the higher speed increases the wind resistance, and takes more power. As a consequence, the motor must be increased in size and weight, or an under-capacity motor must be overloaded. In fact, electric motor failures occur frequently under these circumstances.

It is an object of this invention to overcome the foregoing disadvantages of the prior art. It has been found that the increase in weight of the flail used in this invention enables more substantial results to be obtained with a lesser rotational velocity, about 20% in many cases. Some conventional all-plastic flail devices operate as high as 8,000 rpm. The device of this invention operates optimally at about 6,000 rpm, and usefully as low as 3,500 rpm. These speeds and the power involved with them are well within the capability of a small fractional horsepower engine.

A flail according to this invention includes a plurality of metal filaments braided into an elongated strand having an abradable jacket surrounding and embracing the strand. This flail, when one of its ends is attached to the rotor and the rotor is turned, presents a cutting end to the vegetation where the abradable jacket is soon abraded away to expose a group of loose metallic filament ends. These filament ends are relatively strong yet small in diameter, and exert a good cutting action. Yet they are so light that when they strike a rock or a person's hand they tend to deflect without doing substantial damage and do not propel a rock as a projectile.

According to a preferred but optional feature of the invention, the filaments are made of soft iron alloy such as stainless steel.

The above and other features of this invention will be fully understood from the following detailed description and the accompanying drawings in which.

Figure 1:
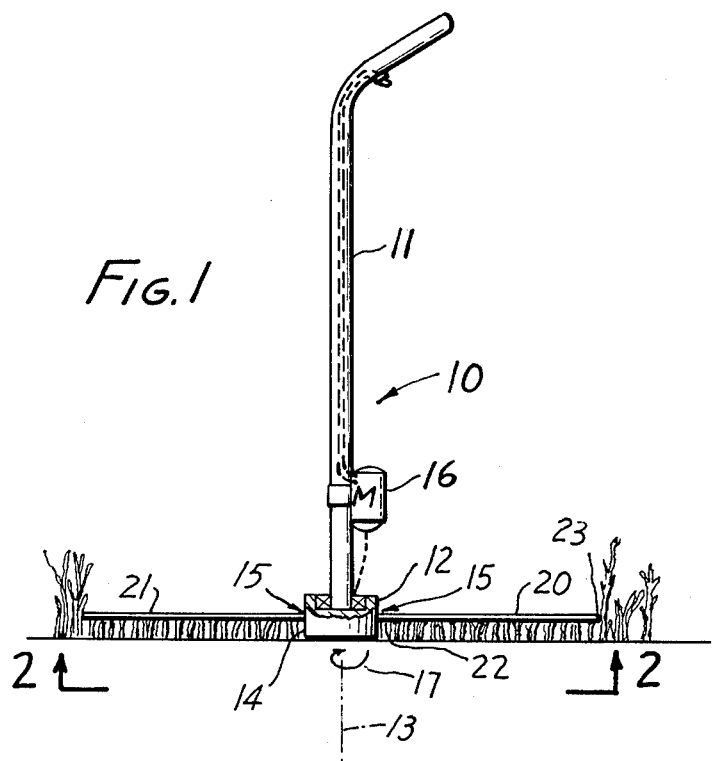
FIG. 1 is a side elevation of a vegetation cutter utilizing the invention.
Figure 2:
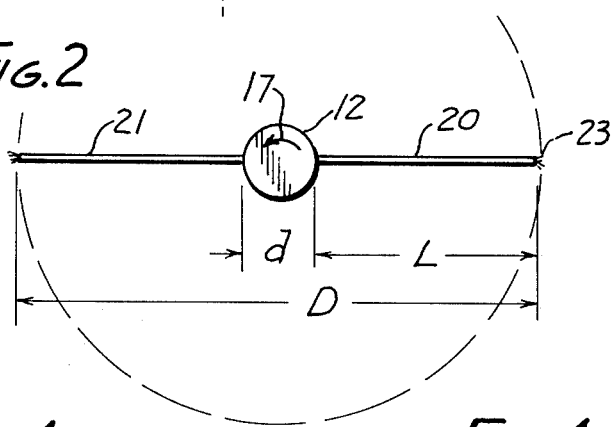
FIG. 2 is a bottom view taken at line 2—2 in FIG. 1 but with the flail shown in operation rather than in repose.
Figure 3:
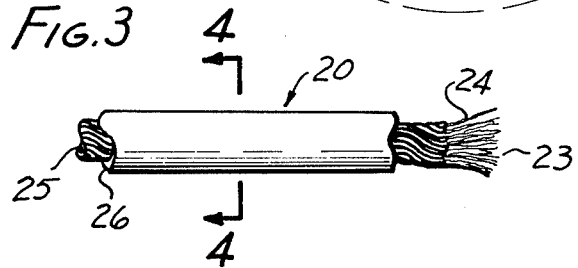
FIG. 3 is a fragmentary side elevation of the flail in FIG. 1.
Figure 4:
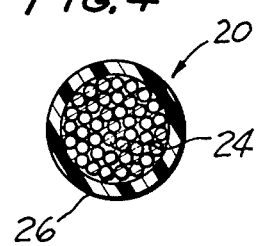
FIG. 4 is a cross-section taken at line 4—4 in FIG. 3.

FIG. 1 shows a vegetation cutter 10 having a handle 11 and a rotor 12. The rotor rotates around a central axis of rotation 13. It has a peripheral wall 14 with a pair of ports 15 through its wall.

A motor 16 mounted to the handle is drivingly connected to the rotor so as to turn the rotor as shown by arrow 17. The motor may be an internal combustion engine or an electric motor as preferred, and is drivingly connected to the rotor by gear or chain means (not shown). The rotor is mounted to the handle by bearing means.

Two (or more) flails 20, 21 which are identical to one another pass from the inside of the rotor where the material is stored, through its wall, and extend as free lengths from the rotor. Both flails are identical, so only flail 20 will be described in detail. Its first end 22 is held by the rotor. Its second end 23 can move as a free end around the axis of rotation 13 to strike and cut material in its path.

Studies have shown that cutting is largely accomplished immediately adjacent to the free end, for example between the free end itself and not much more than about ¾ from the free end. The major portion of the length does not do much, if any, cutting. It has been found that with this flail the maximum useful r.p.m. for cutting is about 6,000 r.p.m. and that it will cut at speeds as low as 3,500 r.p.m. The preferred minimum diameter "D" of the circle traced by the free end (assuming the flail projects radially) is about 8 inches and the preferred maximum is about 14 inches. The preferred free length "L" is about 6 inches from the wall of the rotor when pulled straight out. The rotor will usually preferably be about 2 inches in diameter.

The flail material is usually stored on spools in the rotor, and when the flails wear short, more material is withdrawn from the spool. Locking means (not shown) is provided to hold the spool from unwinding. Such arrangements are shown in the three prior patents disclosed above, and their constructions are incorporated herein by reference.

The flail comprises a plurality of metal filaments 24, each of relatively small diameter braided together to form a strand 25. The braiding may take the form of a conventional wire rope braid wherein a plurality of filaments, often seven in number, are twisted together to form individual strands, and then these small strands are themselves braided to form a still larger strand. This is the preferred embodiment. The free metal ends yet to be described will gradually be exposed in a bushy pattern at the tip (free) end. Abrasion is more gradual nearer the rotor, and the braided group tends to remain in a thickness sufficient to hold the strand together except near to the free end. Alternatively, the filaments may be braided together in the form of a conventional mesh cylinder but this does not appear to be as effective as a typical twisted strand.

An abradable jacket 26 surrounds and embraces the strand so as to hold it assembled as a body having a dimension of length and the said two ends. The jacket is made of abradable material so it can wear off at the tip and expose the filaments. The most convenient material is a resinous plastic such as polyvinyl chloride, polyvinyl acetate or co-polymers thereof. Other resins, and materials other than resins can be used provided that they are suitably abradable at the tip. For example, fiber wrappings, paper wrappings, and the like can be used instead. However a resinous coating is easiest to apply, either as a separate body or as a dip coating.

The filaments are preferably made of an iron alloy. The presently preferred material is a non-heat treated stainless steel. The metal should not be heat treated but should be annealed or otherwise put in its softest condition whereby to resist work hardening and to be readily bendable in response to the forces exerted on it.

The presently preferred flail material is a 7×7 strand (seven filaments in each of seven small strands braided into a larger strand), with a polyvinyl chloride jacket and soft stainless steel filaments between about 0.002 inches and 0.003 inches in diameter. 0.003 inches diameter is about the largest size filament which is desirable. The preferred outer diameter of the jacket is about 0.090 inches. The jacket thickness is the difference between its outer diameter and the nominal (average) outer diameter of the strand.

It will be found in operation, that the plastic material will readily be removed completely for about the last ¾ of an inch so as to expose and free the filaments which then reach outwardly to abrade and cut the vegetation, acting as a plurality of small knives. Because they bend so readily, they are very unlikely to propel a rock or other projectile or to cut the skin of the user.

Accordingly this invention provides the cutting advantages of a metal flail with the lightness of weight and advantages of the plastic device, but in such a way as to provide for longevity of the flail by giving internal structural support to the plastic so that it cracks and abraids less in use except at the very end where it is intended to be worn away.

This invention is not to be limited by the embodiment shown in the drawings and described in the description which is given by way of example and not of limitation, but only in accordance with the scope of the appended claims.

I claim.

1. In combination: a rotor having an axis of rotation, and a flail held by and turned around the axis of rotation, said flail comprising: a plurality of metal filaments braided into an elongated strand having a dimension of length and a pair of ends, and an abradable jacket surrounding and embracing said strand, one end of said flail being connected to said rotor to be rotated around the said axis of rotation, said flail, when rotated around said axis, striking objects in its path, the jacket near its free end abrading away to expose the strand adjacent to its free end, the strand thereafter unraveling where the jacket is abraded away, there to form a group of loose metallic free filament ends to cut vegetation.

2. A combination according to claim 1 in which the filaments are made of an iron alloy in its soft condition.

3. A combination according to claim 2 in which the jacket is made of a resinous plastic material.

4. A combination according to claim 3 in which the filaments are less than about 0.003 inch in diameter.

* * * * *